Aug. 14, 1934.  S. MINNECI  1,970,389
ELECTRICAL CONTROL CIRCUIT
Filed July 22, 1933
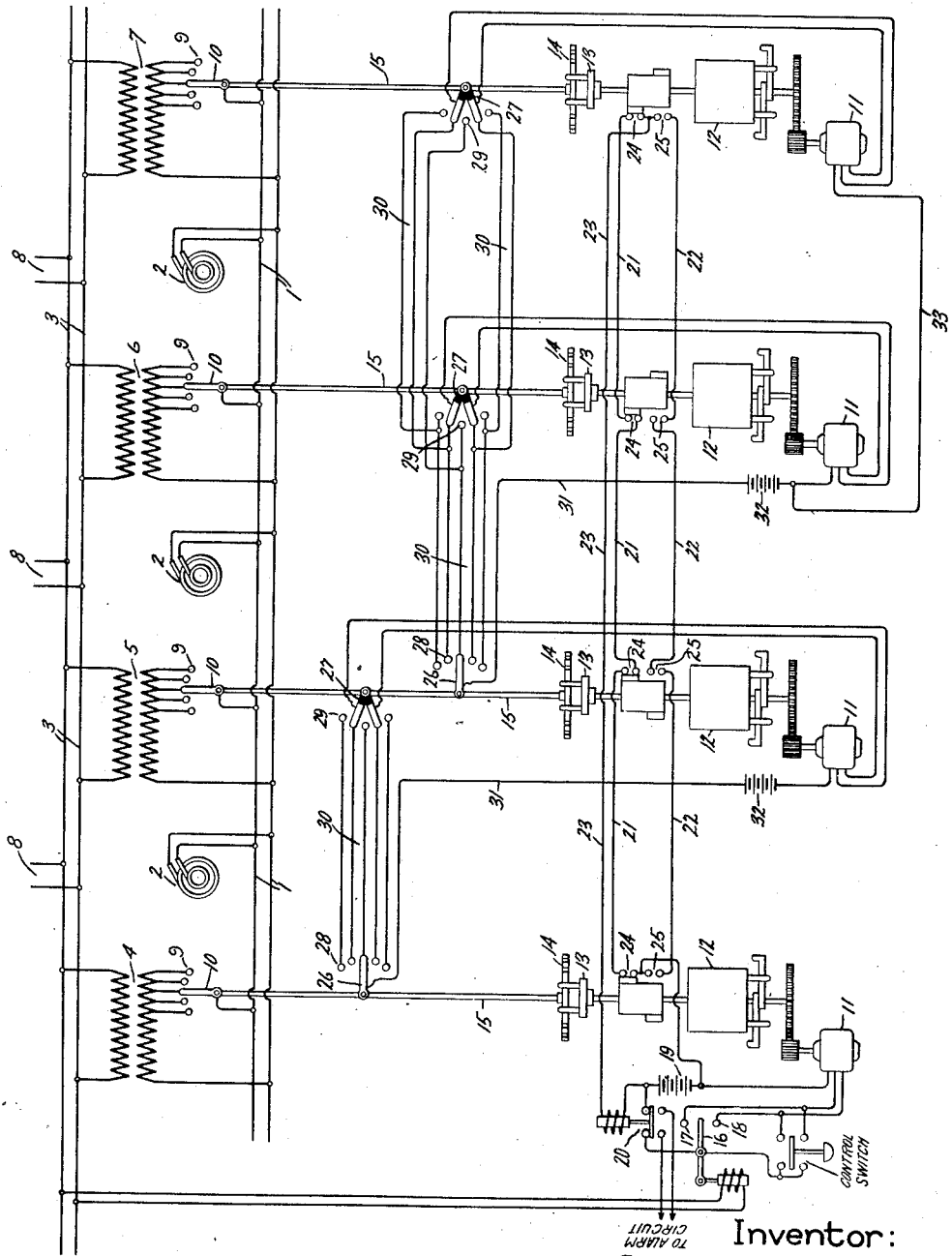
Inventor:
Salvatore Minneci,
by Harry E. Dunham
His Attorney.

Patented Aug. 14, 1934

1,970,389

UNITED STATES PATENT OFFICE 1,970,389

ELECTRICAL CONTROL CIRCUIT

Salvatore Minneci, Pittsfield, Mass., assignor to General Electric Company, a corporation of New York Application July 22, 1933, Serial No. 681,712

3 Claims. (Cl. 171—119)

My invention relates to electrical control circuits, and more particularly to improvements in the control of parallel operated transformer tap changing equipments.

In accordance with my invention I provide a novel system of control for parallel tap changing equipments in which the equipments are not only interconnected by means of novel follow-up connections so that when one equipment makes a tap changing operation the other equipments will follow this equipment and make a similar tap changing operation, but in which the equipments are also interconnected by a novel control circuit arrangement having a minimum number of conductors between equipments and which control circuit arrangement operates to prevent a second operation of a master control equipment until all of the other equipments have made a follow-up tap changing operation corresponding to a first operation of the master equipment.

My invention is independent of any particular type of tap changing equipment and is also independent of whether parallel equipments are on separate parallel connected transformers or whether they are on separate parallel windings on one transformer.

An object of my invention is to provide a new and improved control system for parallel operated tap changing equipments.

Another object of my invention is to provide a new and improved out-of-step protection control for parallel operated tap changing equipments.

My invention will be better understood from the following description taken in connection with the accompanying drawing and its scope will be pointed out in the appended claims.

Referring now to the single figure of the accompanying drawing, I have illustrated therein diagrammatically an embodiment of my invention as applied by way of example, to an electrical distribution system comprising a low tension alternating current bus 1, which is energized by a plurality of generators 2 and which supplies power to a high tension bus 3 through a plurality of parallel connected tap changing voltage regulating transformers 4, 5, 6 and 7. Load circuits 8 are shown leading off from the high tension bus 3. Each of the transformers is provided respectively with a plurality of taps 9 and cooperating movable contact arms 10. The arms 10 are driven by separate motors 11 through suitable tap changing equipments comprising spring drives 12 which drive pinions 13 which, in turn, drive Geneva gears 14 which are connected by shafts 15 to the arms 10. The spring drives 12, the details of which form no part of the present invention, may be of any suitable type, such for example, as the spring drive which is disclosed and claimed in Patent No. 1,891,101, granted December 13, 1932, on an application of G. E. LeCount and assigned to the assignee of the present application. Such a drive is reversible and provides a number of advantages when used for driving a tap changing equipment. Thus, it is possible to use a very small driving motor, as the spring can be wound up gradually until the necessary tension is reached. Furthermore, this gradual winding up the spring provides a time delay which is an advantage in preventing unnecessary operation of the regulating equipment due to momentary voltage changes in applications of tap changing equipment to voltage regulating transformers.

The tap changing equipment for transformer 4 is made responsive to the voltage of circuit 3 by means of a voltage responsive controller, such as a contact making voltmeter 16 having raise and lower contacts 17 and 18, respectively. These contacts are connected to reversing connections for motor 11 and the return circuit for this motor is through a suitable source of current supply, such as a battery 19 and the contacts of a relay 20 whose control will be described immediately hereafter, and whose purpose is to break the energizing circuit for motor 11, except when all the transformers are operating on corresponding, or equal voltage, taps.

The control for relay 20 comprises a circuit, including the battery 19, having two parallel branches 21 and 22, and a return conductor 23. Each of the spring drives 12 is provided with sets of contacts 24 and 25 and these contacts are so controlled by the spring drives that all of the contacts 24 are closed and all of the contacts 25 are open when the tap changing equipments are in the position shown in the drawing. However, should the tap changing equipments operate to change one tap in either direction the contacts 24 will open and the contacts 25 will close. If another tap changing operation is made by all of the equipments the contacts 25 will open and the contacts 24 will again close. As shown, the contacts 24 are connected in branch 21 and the contacts 25 are connected in branch 22.

Follow up connections for causing the tap changing equipments for transformers 5, 6 and 7 to follow the equipments for transformer 4, are also provided. The follow up connections for transformers 5 and 6 may be what is termed "series" follow up connections in that after transformer 4 has changed one tap transformer 5 will change a tap and thereafter transformer 6 will change a tap in response to the operation of transformer 5. The follow up connections for transformer 7 may be what is termed "parallel" follow up connections in that the connections for operating transformer 7 are in parallel with the follow up connections for operating transformer 6 so that the tap changing equipments for transformers 6 and 7 operate simultaneously in a follow up manner in response to the operation of the tap changing equipment for transformer 5.

The follow up connections between the tap changing equipments for transformers 4 and 5 include dial switches comprising movable contact members 26 and 27 operated respectively by the shafts 15 of the tap changing equipments for transformers 4 and 5 and these movable contact members 26 and 27 cooperate respectively with similar sets of stationary contacts 28 and 29. There are as many contacts in each set as there are taps on the transformers and corresponding contacts are interconnected by means of conductors 30. Contact 26 is a single contact and is connected by means of a conductor 31 to the driving motor 11 for the tap changing equipment for transformer 5 through a suitable source of current supply, such as a battery 32. Contact 27 is a double, or forked, contact member whose two relatively insulated arms are connected respectively to reversing connections for motor 11. As shown, the circuit for motor 11 is open because the two arms of contact 27 are in engagement with two contacts 29 which are on each side of the contact 29 which is connected to the contact 28, which in turn is in engagement with the movable contact 26. The follow up connections between the tap changing equipment for transformer 5 and the tap changing equipment for transformer 6 is identical with the previously described follow up connection and consequently the same reference characters have been applied to corresponding parts of this follow up connection.

The follow up connection for operating the tap changing equipment for transformer 7 is a "parallel" type connection in that the tap changing equipment for transformers 6 and 7 are both operated in parallel from the tap changing equipment for transformer 5. Consequently the tap changing equipment for transformer 7 is provided with follow up connections similar to the elements provided on the equipment for transformer 6 and the connections 30 to the contacts 29 are connected in parallel with the connections 30 for the contacts 29 of the equipment for transformer 6. The circuit for motor 11 of the equipment for transformer 7 is completed through a conductor 33.

The complete operation of the illustrated embodiment of my invention is as follows: Assume that generators 2 are being operated by suitable prime movers (not shown) and that a change in voltage occurs on circuit 3 which needs to be corrected. Under these circumstances the contact making voltmeter 16 will respond to the voltage change so as to close either its raise or lower contacts depending upon whether the voltage is below or above normal, respectively. This operation of the contact making voltmeter will complete a circuit for operating motor 11 in the proper direction to wind the spring drive 12 and after a predetermined time this spring drive will release and will make one-half revolution, thereby turning the pinion 13 one-half revolution and moving the contact finger 10 so as to change taps on transformer 4 in the proper direction to produce a corrective voltage change. At the same time that the spring drive snaps through 180 degrees the contacts 24 thereon are opened and contacts 25 thereon are closed. The opening of contacts 24 opens the branch conductor 21 in the energizing circuit for relay 20 and consequently this relay drops out thereby breaking the energizing circuit for motor 11 of the tap changing equipment for transformer 4, whereby this motor comes to rest and further operation of the tap changing equipment for transformer 4 is prevented, regardless of the voltage of circuit 3.

At the same time that a tap is changed on transformer 4 the contact arm 26 will move one contact position thereby completing a circuit from the battery 32 through conductor 31, the contacts 26, one of the conductors 30 to one of the contacts 29 and one of the fingers on contact 27, depending upon in which direction the contact 26 has been moved, and thence through the proper reversing connection for motor 11 and back to the source of current supply 32. The reversing connections are so arranged with respect to the contact fingers of contact 27 that the motor 11 will be operated in the proper direction to cause its associated tap changing equipment to make a tap change on transformer 5 which corresponds to the tap change on transformer 4. As soon as this operation is completed a similar follow up action takes place between the tap changing equipments for transformers 5 and 6 whereby the equipment for transformer 6 will make a tap change corresponding to the tap changes for transformers 4 and 5. Simultaneously with the operation of the tap changing equipment for transformer 6 the tap changing equipment for transformer 7 will also operate to make a corresponding tap change due to the fact that its contacts 29 and cooperating movable contact 27 are in parallel with the corresponding elements for the equipment for transformer 6. As each of the equipments for transformers 5, 6 and 7 completes a tap changing operation their respective contacts 24 will be opened and their contacts 25 will be closed. Consequently, when all four of the tap changing equipments have completed a corresponding tap change, all of the contacts 25 will be closed and consequently the branch circuit 22 will be completed thereby completing an energizing circuit for the relay 20 through the source 19 and the return conductor 23. Consequently the entire system is now ready for another tap changing operation in response to voltage conditions on the circuit 3.

Although, for the sake of convenience, I have illustrated in one figure a system embodying two different types of follow-up connections, namely the "series" type, wherein the equipments for transformers 5 and 6 follow up the operation of the master equipment for transformer 4 sequentially through "series" connections, and the "parallel" type, wherein the equipments for transformers 6 and 7 follow up the operation of the equipment for transformer 5 simultaneously through "parallel" connections, it should be understood that my invention is not limited to such a system and it will be obvious to those skilled in the art that either the "series" or "parallel" type may be used alone. Thus, for example, if only the "series" type is desired either the transformer 7 and its equipment may be omitted or "series" connections between the equipments for transformers 6 and 7 can be substituted for the existing "parallel" connection. Such substituted "series" follow-up connections would be identical with the follow-up connections between transformers 5 and 6 or between transformers 4 and 5. Likewise, if only "parallel" follow-up connections are desired, either transformer 4 may be omitted and transformer 5 made the master equipment, which it already is with respect to transformers 6 and 7, or else "parallel" connections, like the one between transformers 6 and 7, can be substituted for the "series" connection between transformers 5 and 6.

It should also be understood that my invention is not limited to any particular number of transformer units and that any desired number of additional units may be added to the system by means of either "series" or "parallel" type follow-up connections.

It may sometimes be desirable to control manually the operation of the master tap changing equipment and consequently I have illustrated a manually operated control switch having contacts in parallel with the raise and lower contacts of the contact making voltmeter 16.

It is also sometimes desirable to give an alarm or signal at times when the tap changing equipments are out of step, and consequently I have shown a set of back contacts on the relay 20 for controlling a suitable alarm or signal circuit.

While I have shown and described a particular embodiment of my invention, it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a plurality of multi-tapped transformer windings, individual tap changing mechanisms for each winding, follow up connecting means between said mechanisms whereby when a particular mechanism completes a tap changing operation the other mechanisms will make corresponding tap changing operations, means for initiating the operation of said particular mechanism, and interconnecting means between all of said mechanisms for preventing a second operation of said particular mechanism until all of said mechanisms have completed a first operation.

2. In combination, a plurality of multi-tapped transformer windings, individual motor driven tap changing mechanisms for each of said windings, means for controlling the operation of one of said mechanisms, and parallel follow up connections between said one mechanism and each of said other mechanisms, respectively, whereby operation of said one mechanism results in a simultaneous follow-up operation of the other mechanisms.

3. In combination, a plurality of parallel multi-tapped transformer windings, individual motor operated tap changing equipments for each winding, means for controlling the operation of one of said equipments, individual dial switches operated by each of said equipments, circuit connections for connecting corresponding stationary contacts of said dial switches in parallel, and circuit connections connecting the movable contact of the dial switch of said one equipment to the movable contacts of the other dial switches in parallel through the respective operating motors of their respective equipments.

SALVATORE MINNECI.